(12) United States Patent
Chowdhury

(10) Patent No.: US 6,797,052 B1
(45) Date of Patent: Sep. 28, 2004

(54) METHOD FOR USING ACTIVATED CARBON FOR PRODUCING MOISTURE-BLOCKING DURABLE CEMENT, COMPOSITION FOR THE SAME AND METHOD OF CHARACTERIZING THE SAME

(76) Inventor: Benoy Chowdhury, 407 Wallenpaupack Lake Estates, Lake Ariel, PA (US) 18436

( * ) Notice: Subject to any disclaimer, the term of this patent is extended or adjusted under 35 U.S.C. 154(b) by 3 days.

(21) Appl. No.: 10/336,300

(22) Filed: Jan. 3, 2003

(51) Int. Cl.$^7$ .......................... C04B 24/24; C04B 22/02
(52) U.S. Cl. ..................... 106/814; 106/677; 106/717; 106/724; 106/802
(58) Field of Search .............................. 106/677, 724, 106/802, 814, 717

(56) References Cited

U.S. PATENT DOCUMENTS 2,609,882 A * 9/1952 Morgan et al. ............. 166/292
4,332,619 A * 6/1982 Gandy et al. ............... 106/642
4,737,191 A * 4/1988 Meynardi ................... 106/811
5,683,344 A * 11/1997 Channell et al. ............ 588/257

FOREIGN PATENT DOCUMENTS

| JP | 47-36631 B | * | 11/1972 |
| JP | 52-75680 A | * | 6/1977 |
| JP | 53-61584 A | * | 6/1978 |
| JP | 57-61659 A | * | 4/1982 |

* cited by examiner

*Primary Examiner*—Anthony J. Green

(57) ABSTRACT

Use of activated carbon powder in a cement formulation having vinyl polymers that results in effectively eliminating the problem of moisture retention due to void formation during mixing and atmospheric moisture uptake. In the compositions and methods described it has been determined that an adduct formed from the interaction of the activated carbon and vinyl polymers fills voids typically present in finished concrete products. The adduct within the voids results in a hydrophobic cement composition.

10 Claims, 10 Drawing Sheets

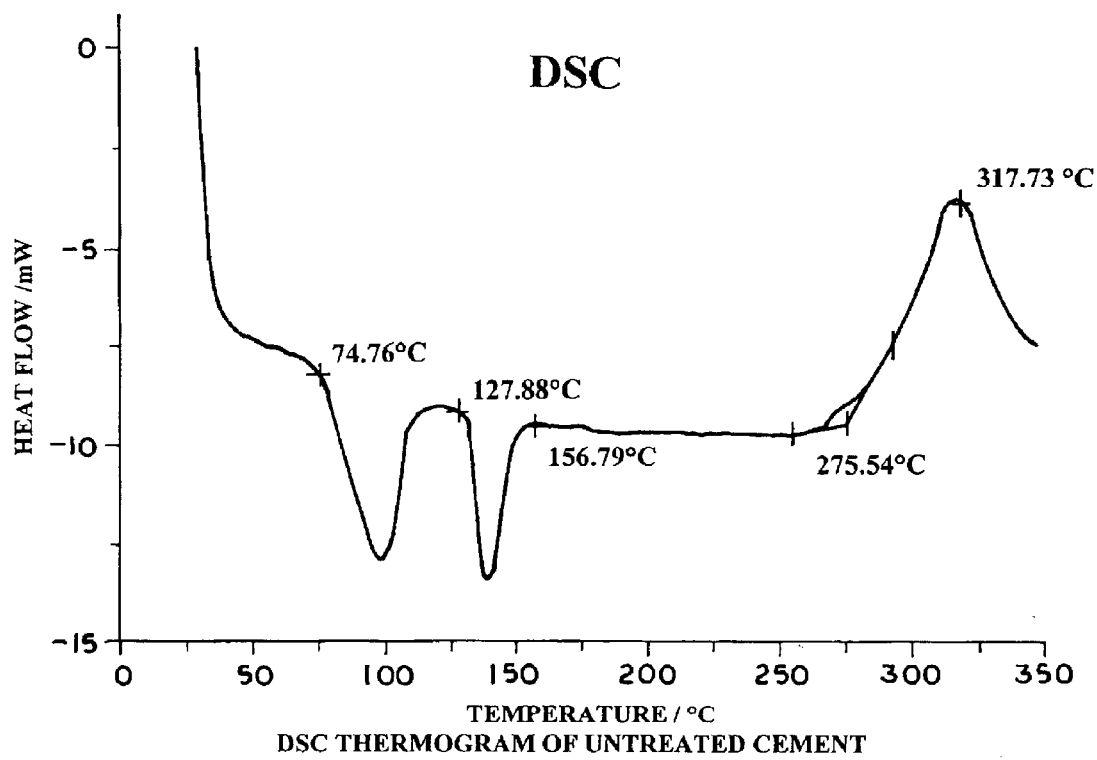
DSC THERMOGRAM OF UNTREATED CEMENT
Fig_1
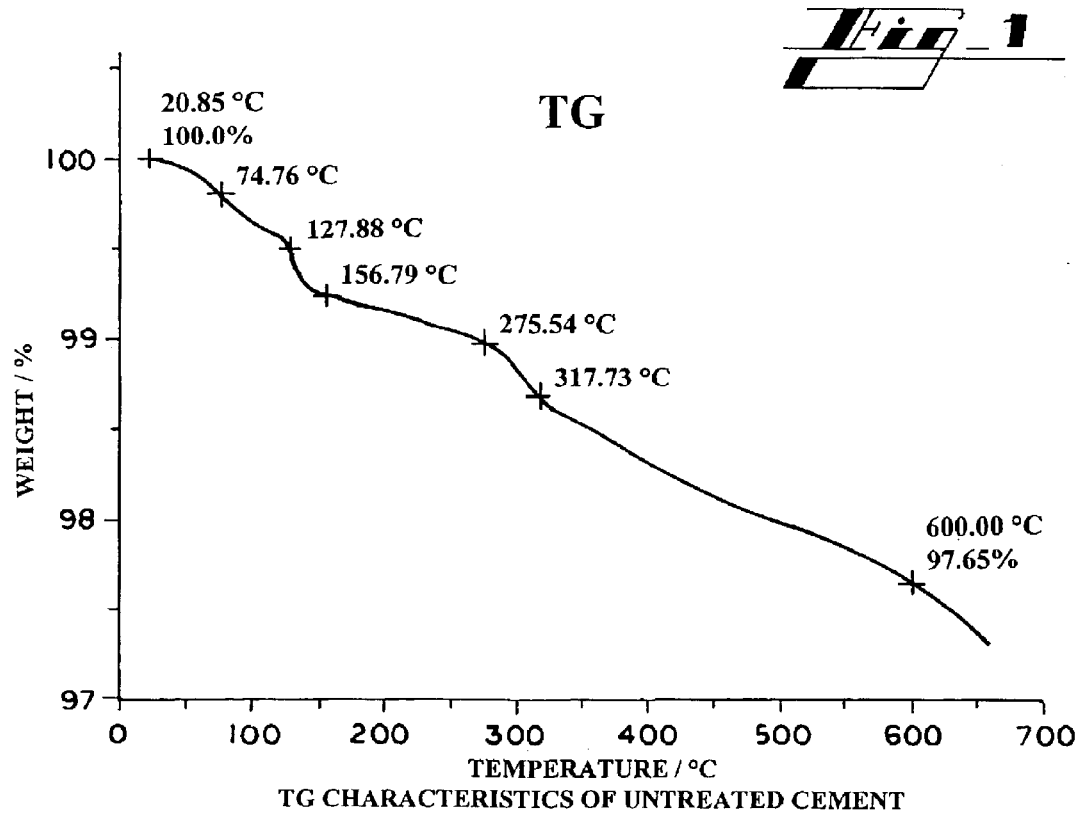
TG CHARACTERISTICS OF UNTREATED CEMENT
Fig_2

DSC THERMOGRAM OF UNTREATED CEMENT EXPOSED TO 100% RH

TG CHARACTERISTICS OF UNTREATED CEMENT EXPOSED 100% RH

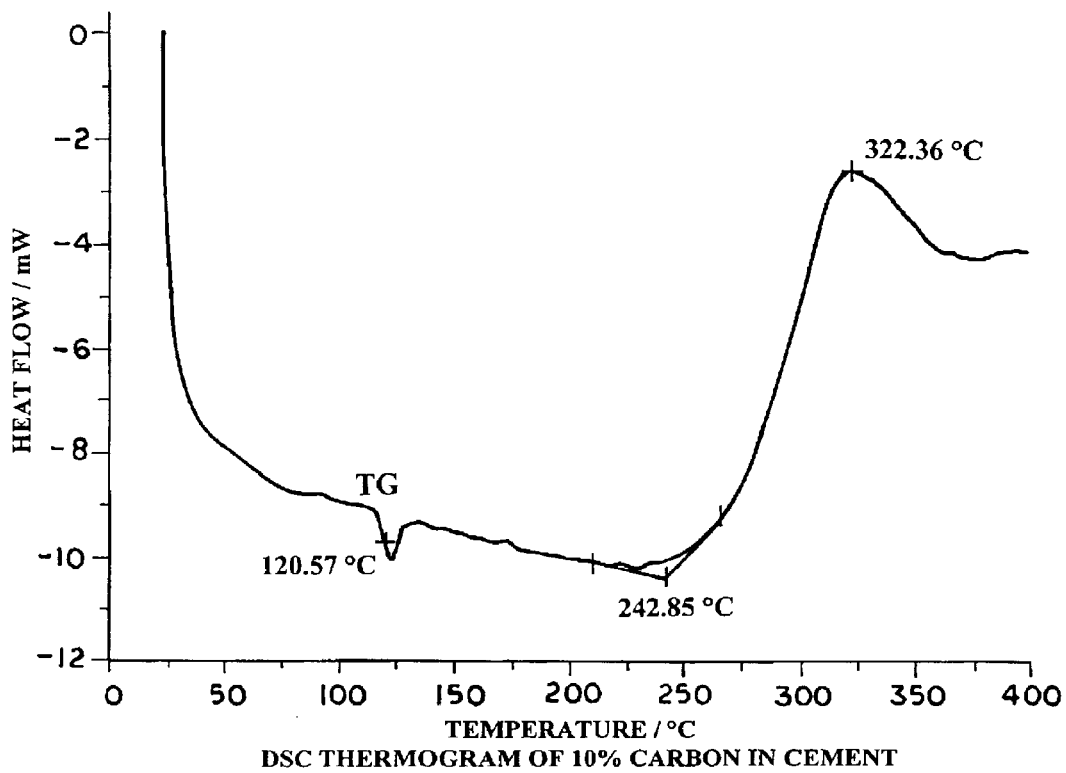
DSC THERMOGRAM OF 10% CARBON IN CEMENT
Fig_5
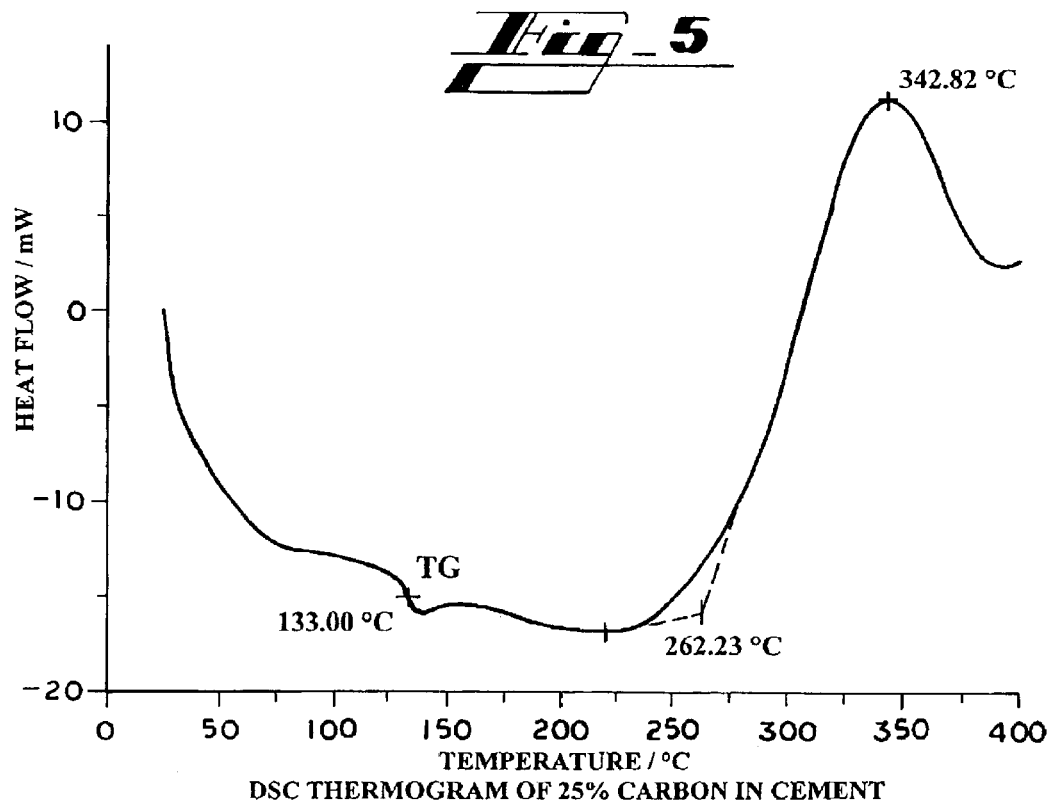
DSC THERMOGRAM OF 25% CARBON IN CEMENT
Fig_6

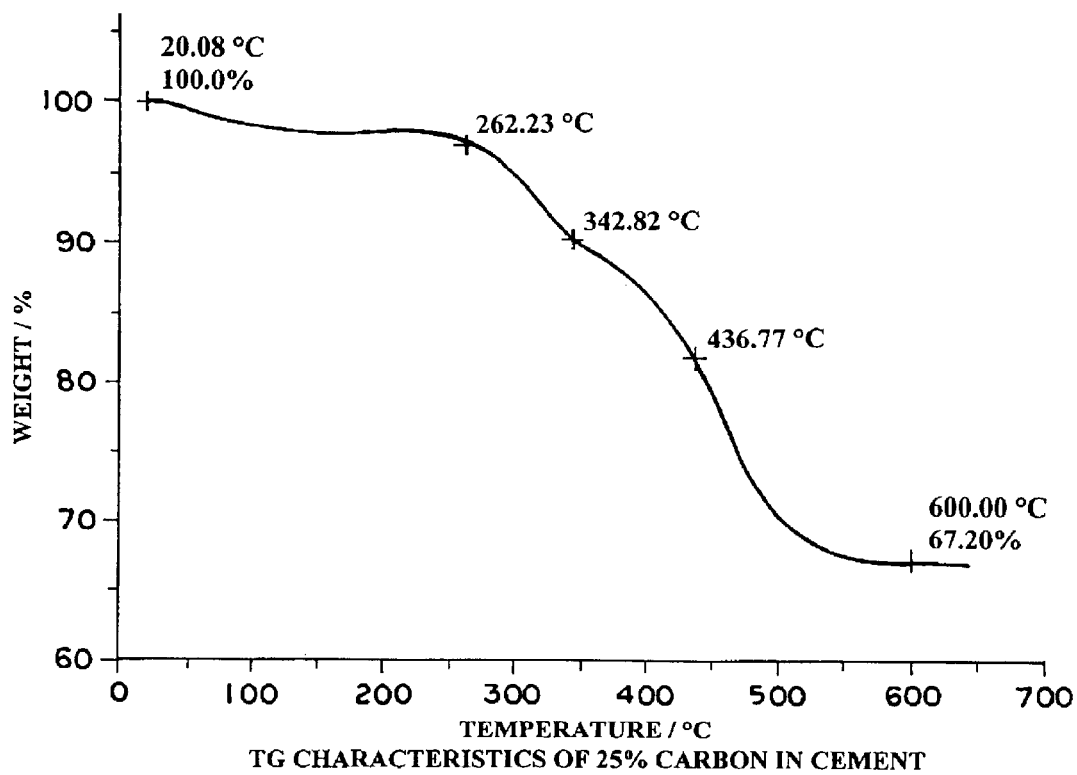
Fig_7
TG CHARACTERISTICS OF 25% CARBON IN CEMENT
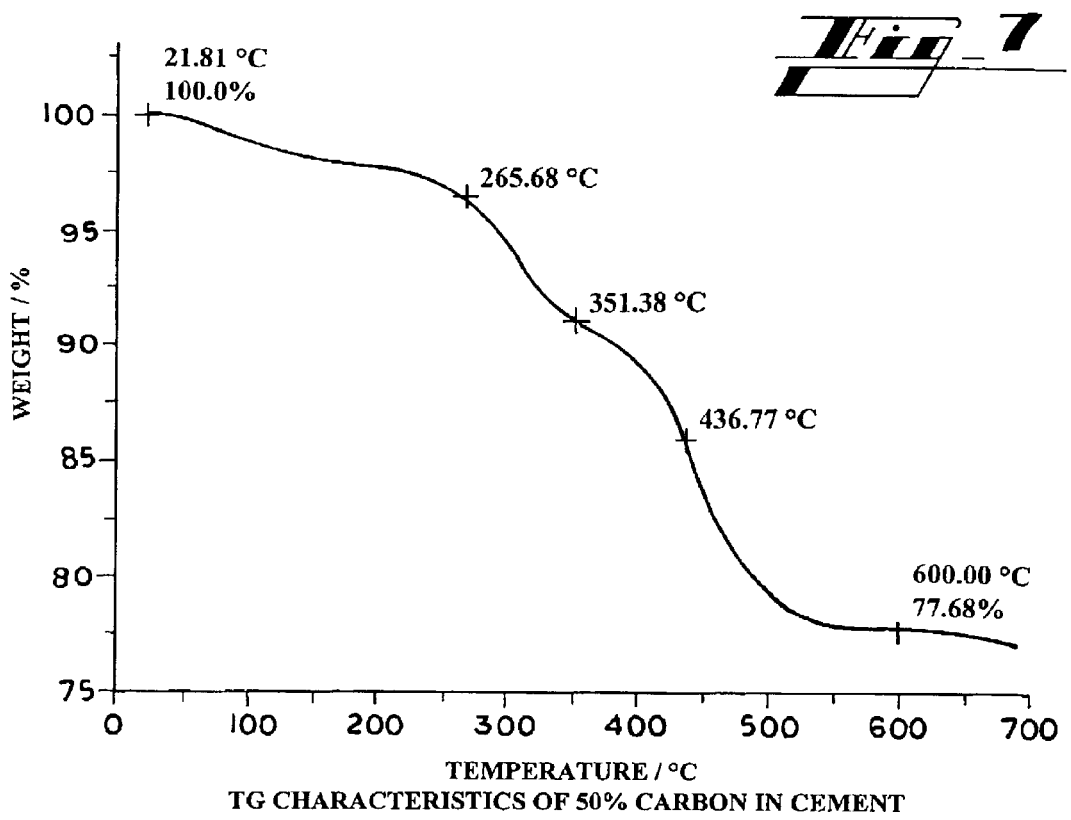
Fig_8
TG CHARACTERISTICS OF 50% CARBON IN CEMENT

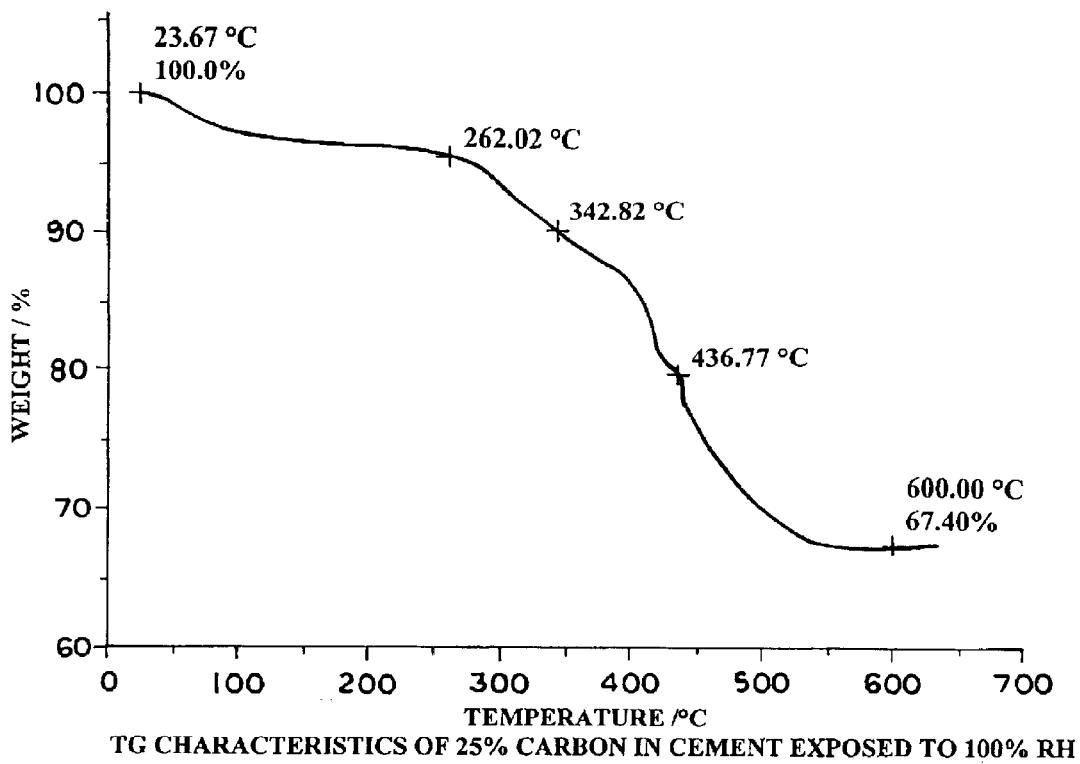
TG CHARACTERISTICS OF 25% CARBON IN CEMENT EXPOSED TO 100% RH
Fig_9
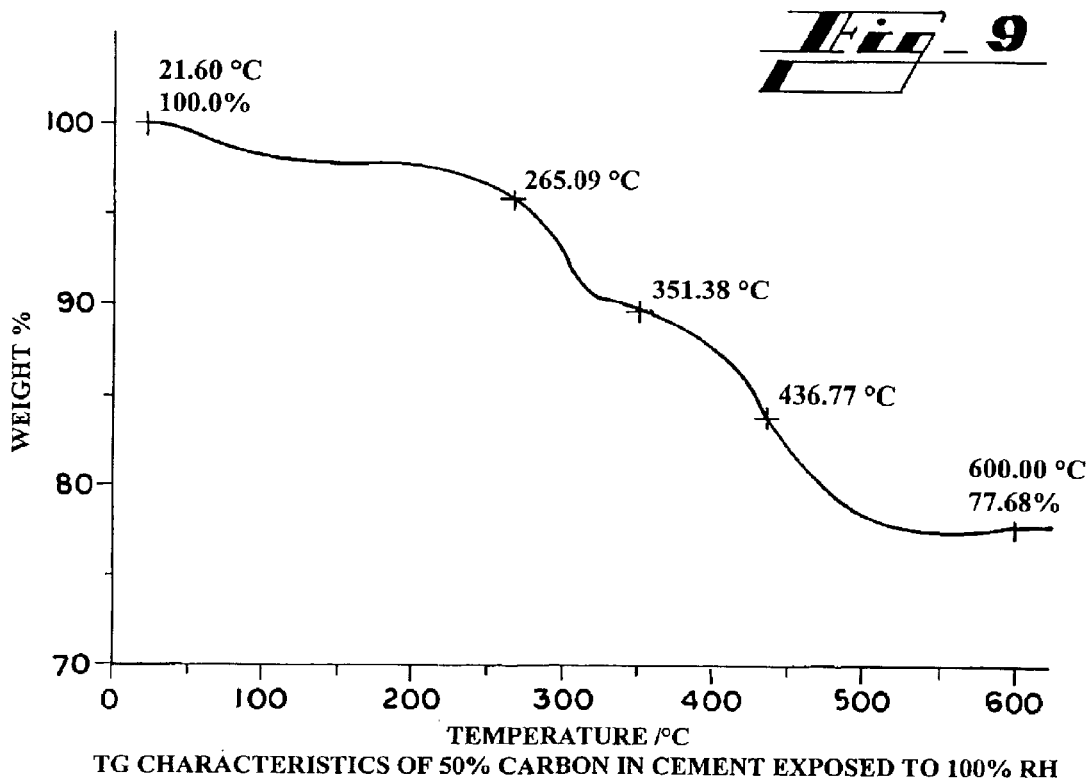
TG CHARACTERISTICS OF 50% CARBON IN CEMENT EXPOSED TO 100% RH
Fig_10

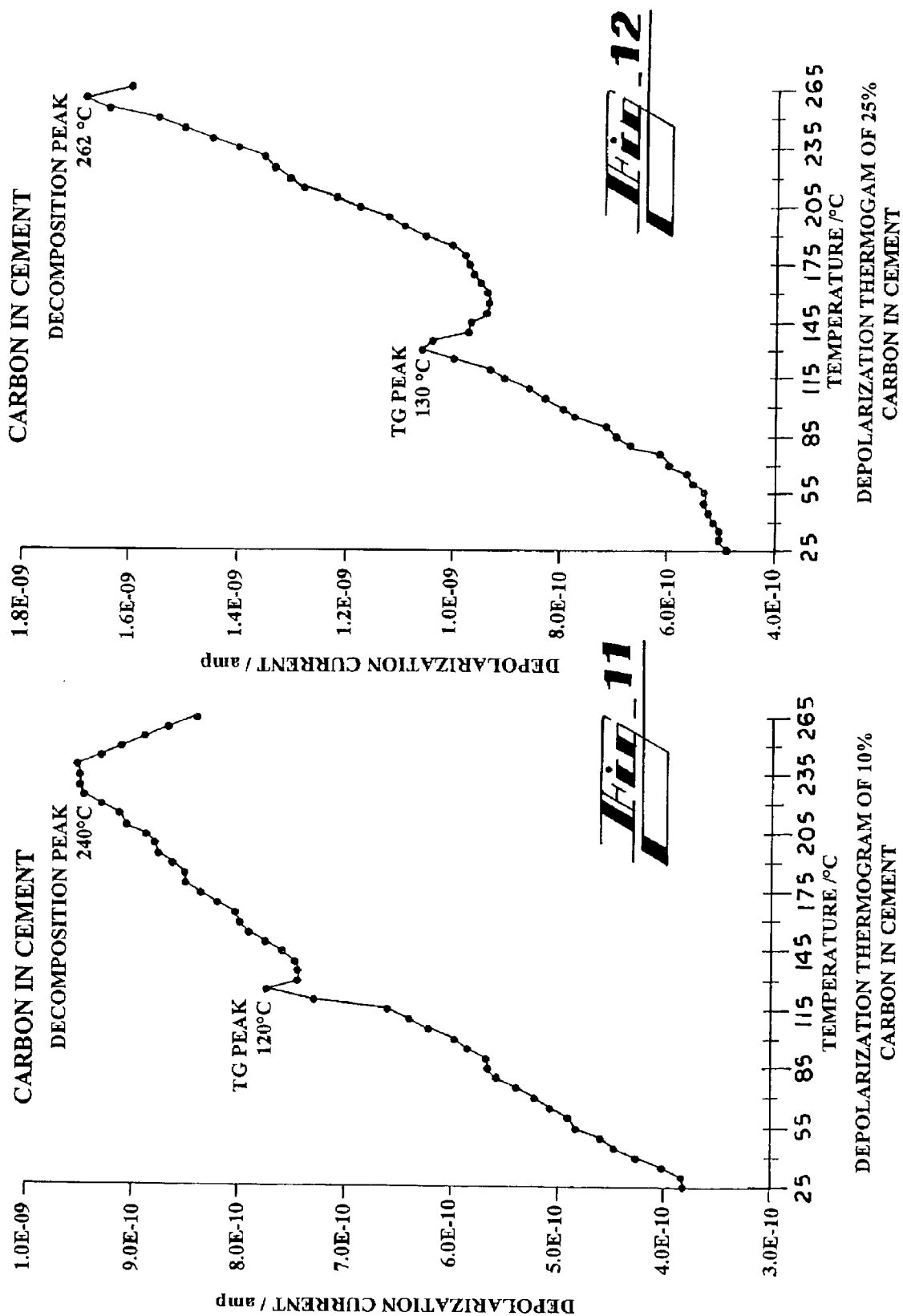

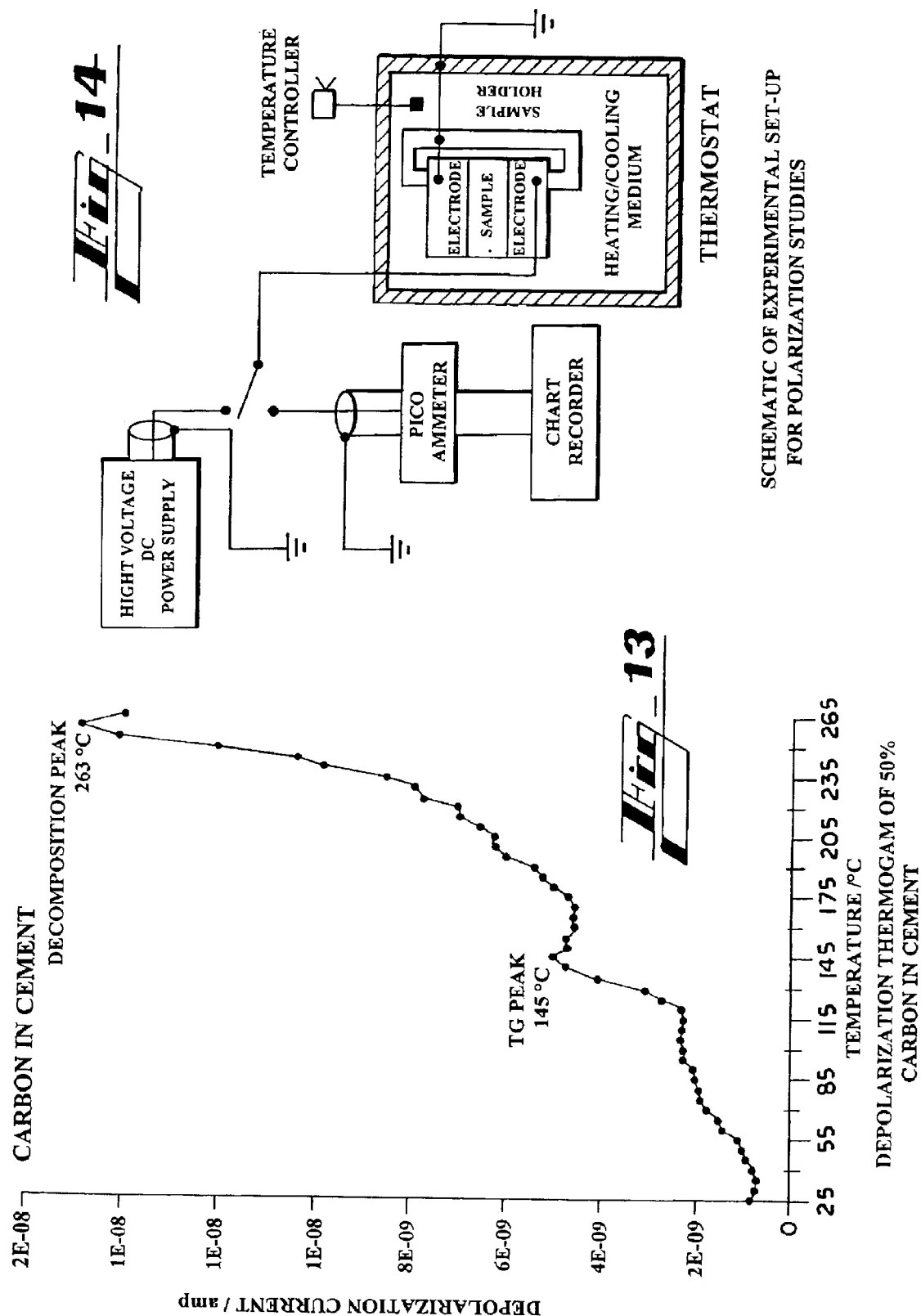

RELAXATION TIME vs TEMPERATURE

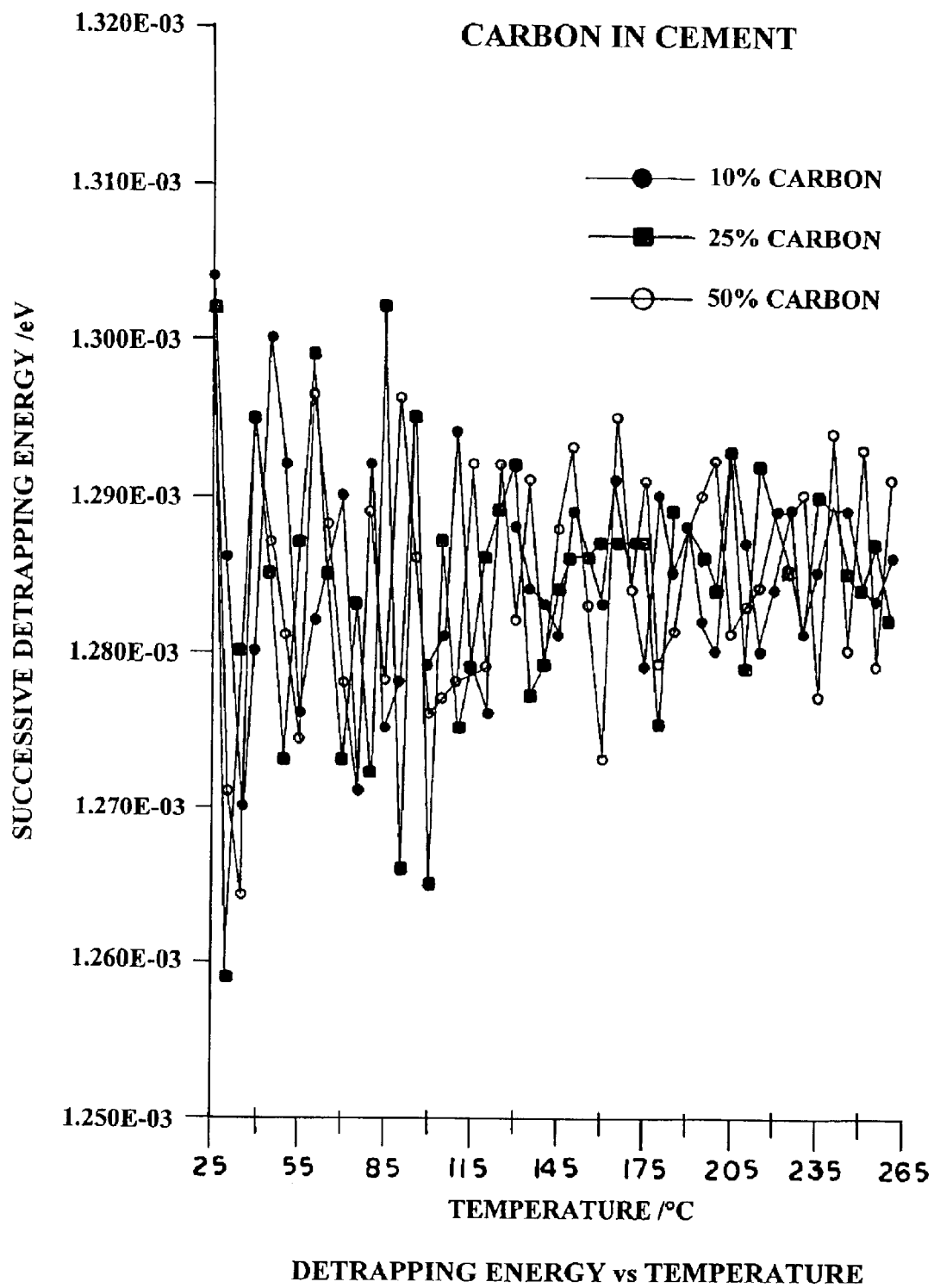
DETRAPPING ENERGY vs TEMPERATURE
*Fig_16*

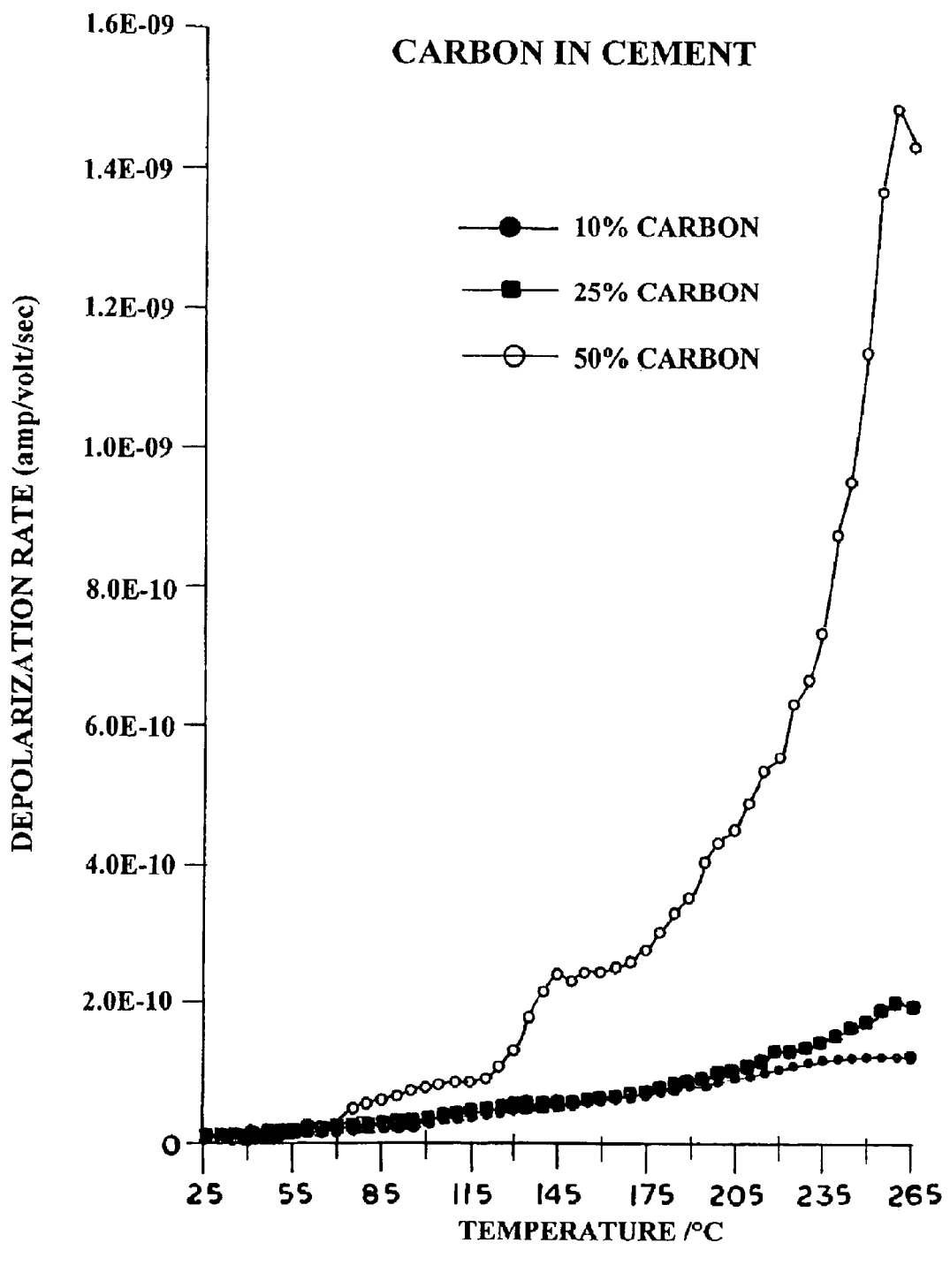
DEPOLARIZATION RATE vs TEMPERATURE
Fig_17

METHOD FOR USING ACTIVATED CARBON FOR PRODUCING MOISTURE-BLOCKING DURABLE CEMENT, COMPOSITION FOR THE SAME AND METHOD OF CHARACTERIZING THE SAME

BACKGROUND OF THE INVENTION

I. Field of the Invention

The present invention relates generally to the field of concrete and cement and more particularly to a method of reducing and eliminating voids in finished cement products by the addition of activated carbon which results in a hydrophobic concrete composition with reduced voids.

II. Description of the Related Art

Voids are formed in concrete and cement structures as the structure is prepared, due to dehydration, typically during the mixing process. Voids are typically air spaces that can ultimately be occupied by moisture creating localized failure points in concrete. The void formation results in moisture retention in the structures and further moisture uptake by the resulting porous structure. Inherent moisture in cement causes loss of structural integrity in finished concrete as well as undermining the adhesion of finished concrete. Sometimes, occluded air in the cement is driven off to collapse pore volume during mixing. One attempt at addressing moisture retention in cement is the formation of Macro-Defect-Free (MDF) cement. These improved cement formulations, also called organo-cement composites, contain specific polymers are typically used as a patching compound where adhesion and durability are important performance factors. It has been determined that while the polymer content of these formulations plays a role in the increased strength of the cement, detrimental moisture ingress is also promoted. Resultant plasticization is a major cause of the loss of mechanical strength in finished concrete. Therefore, although the MDF cement can be strong in terms of its load bearing capacity, the formation of voids in the initial mixing and the retention and ingress of moisture remain a problem in the structure due to crack formation.

SUMMARY

In general, the invention features a method of using activated carbon in cement mixtures, which can include vinyl polymers. The method and resulting composition can reduce or eliminate moisture retention and moisture uptake in finished cement products. The invention also features a general characterization method of the resulting composition. Use of activated carbon powder in a cement formulation has been determined to result in effectively eliminating the problem of moisture retention due to void formation during mixing and atmospheric moisture uptake. The finished cement product is hydrophobic.

In general, in one aspect, the invention features a composition, including a cement mixture and activated carbon, wherein the cement and activated carbon are mixed together in water.

In one implementation, the activated carbon is added to comprise a weigh percentage of the mass of the dry cement.

In another implementation, the activated carbon constitutes 10% of the total mass of the dry cement.

In another implementation, the activated carbon constitutes 25% of the total mass of the dry cement.

In another implementation, the activated carbon constitutes 50% of the total mass of the dry cement.

In another implementation, a commercially available cement can be used.

In another implementation, a cement composition of crushed limestone, silica, iron and aluminum can be used.

In another implementation, the cement further comprises a vinyl polymer.

In another aspect, the invention features a finished concrete composition, including a hardened cement mixture, the mixture including vinyl polymers and activated carbon, the composition having a plurality of filled voids, the voids being filled with activated carbon having interacted with the vinyl polymers.

In one implementation, the voids are filled with an adduct formed by the interaction of the activated carbon and the vinyl polymers.

In another aspect, the invention features a method of manufacturing concrete having reduced voids, including mixing a portion of cement, silica, a vinyl polymer and activated carbon in water, wherein the activated carbon is a weight percentage of the total mass of the cement.

In one implementation, the mixture is mixed to a pasty consistency.

In another implementation, the mixture is allowed to stand for a period of time.

In another implementation, the mixture is heat treated to form solid concrete.

In still another aspect, the invention features a cement composition, including a cement formulation including vinyl polymers and activated carbon wherein valence electrons of the carbon are in chemical interaction with $\pi$-electron of double bonds of the vinyl polymers.

In yet another aspect, the invention features a composition, including a cement mixture containing limestone, silica and vinyl polymers. The vinyl polymers are dispersed throughout the cement mixture along with activated carbon capable of reacting with the double bonds of the vinyl polymer to form an adduct in voids that are inherent in the cement mixture when the cement mixture has solidified.

One advantage of the invention is that moisture content is reduced or eliminated in finished cement products.

Another advantage of the invention is that voids are reduced or eliminated in finished cement products.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a DSC therminogram of untreated CP-1 cement;

FIG. 2 illustrates the TG characteristics of the untreated CP-1 cement;

FIG. 5 illustrates the DSC thermograms for 10% by weight activated carbon in an embodiment of the cement;

FIG. 6 illustrates the DSC thermograms for 25% by weight activated carbon in an embodiment of the cement;

FIG. 7 illustrates the TG characteristics supporting the DSC transition values obtained for the embodiment containing the 25% carbon level;

FIG. 8 illustrates the TG characteristics supporting the DSC transition values obtained for the embodiment containing the 50% carbon level;

FIG. 9 illustrates the TG characteristics of 25% by weight carbon in cement embodiment exposed to 100% RH;

FIG. 10 illustrates the TG characteristics of 50% by weight carbon in cement embodiment exposed to 100% RH;

FIG. 11 illustrates the depolarization thermogram of the 10% carbon in cement embodiment;

FIG. 12 illustrates the depolarization thermogram of the 25% carbon in cement embodiment;

FIG. 13 illustrates the depolarization thermogram of the 50% carbon in cement embodiment;

FIG. 14 illustrates a standard experimental setup for the polarization studies;

FIG. 16 illustrates that depolarization current arises from randomized trap levels; and FIG. 17 illustrates that the depolarization rate is highest for the 50% carbon level in keeping with its lowest relaxation time (see FIG. 15 above).

DETAILED DESCRIPTION

Figure 3:
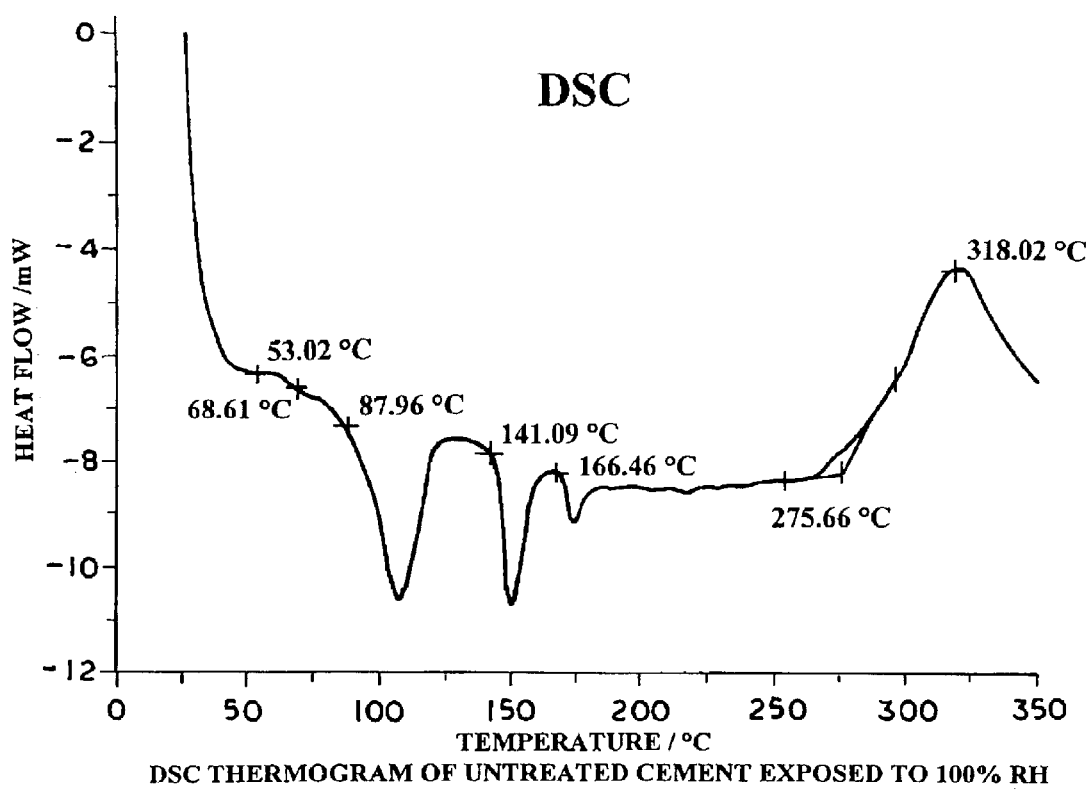
FIG. 3 illustrates the DSC characteristics of the CP-1 cement exposed to 100% RH.

Use of activated carbon powder in a cement formulation that results in effectively eliminating the problem of moisture retention due to void formation during mixing and atmospheric moisture uptake is disclosed.

In one embodiment a method producing a hydrophobic cement product is disclosed. Typically, commercially available cement mixtures are prepared with activated carbon. The active carbon used in this embodiment can be obtained in a variety of ways in which carbon atoms, which are not normally chemically active, become activated and therefore can easily interact with other atoms and compounds. In one implementation, activated carbon can be obtained from reductive burning of bio-organic waste materials for a period of time in the presence of other compounds. For example, the bio-organic waste can be burned for about thirty minutes at 900° C. under methane and a small excess of oxygen from air. The active carbon thus produced possesses bonding properties and is electroactive. Typically, a cement mix is prepared by mixing cement, silica, a vinyl polymer, similar to the vinyl polymers used in the MDF formulations, and activated carbon. Cement typically includes crushed limestone, silica, iron and aluminum materials. Typically, any commercially available cement mixture is contemplated for use in the embodiments described herein. The cement mixture is mixed with water and allowed to stand. Samples can be prepared and heat treated for a period of time. The patching compounds used in several embodiments described herein include a vinyl polymer in addition to silica and cement.

As discussed further below, electron paramagnetic resonance (EPR) studies disclose the bonding properties of the activated carbon. Elemental carbon is not ordinarily electroactive and has only covalency. However, the EPR measurements show weak paramagnetism, indicating the presence of free valences in the active carbon. This free valency can react with the double bonds in the polymer.

Vinyl polymers, which are typically included in the MDF mixtures, are also present in the embodiments of the mixture so that carbon-vinyl bonding is feasible, resulting in the filling of the voids, as described further below. It has been theorized that the carbon-polymer interaction can be interpreted as an adduct formation between carbon and the double bonds of a vinyl compound such as a vinyl polymer in the form $(CH_2=CH-)_n$. The adduct formation can be due to valence bonding of the active carbon valencies with the $\pi$-electrons of the double bonds in the vinyl polymer. The bonding properties of the carbon is realized by invoking an electron promotion mechanism from the ground state configuration: $C(1s^2 2s^2 2p^2) \rightarrow C(1s^2 2s^1 2p_x^1 2p_y^1 2p_z^1)$, providing identical bonds available for sp hybridization. Coordination is therefore possible between the carbon and $\pi$-electrons of the vinyl double bonds due to mutual polarization from induced dipoles in each partner. An overlap of coordination spheres (that is, the sphere of influence within which electron acceptance and donation can occur between reacting partners) can be justified for formation of a particular conformation of carbon-vinyl adduct, which is theorized to be responsible for the moisture blocking in the finished cement matrix in which the activated carbon has been used.

In another embodiment, the composition, carbonaceous cement, resulting from the method is disclosed. The resulting compound is a void-free hydrophobic cement composition having activated carbon. As described above, the activated carbon atoms bonds with the polymer to form an adduct that can fill the voids in the finished cement product. As described further below, thermal and voltage induced polarization techniques verify that the carbon atoms bond with the polymers as well as the nature of the carbon-polymer interaction. Microscopic investigation of the prepared samples reveals the filling of the voids by the carbon powder. As described above, the interaction of the carbon atoms in the activated carbon with the double bonds of vinyl polymers in the cement mix attribute to the filling of the voids with the carbon. Interaction of the carbon with the polymer in the cement results in the formation of an adduct that blocks moisture uptake. Visual inspection typically discloses absence of voids.

EXAMPLE

A commercial patching compound containing Portland cement, silica and a vinyl polymer referred to here as CP-1, is used to prepare test samples. Sample discs measuring approximately 6×0.75 cm are prepared by adding plain water (c:w=7:1) to the compound to a loose paste consistency. The mix is allowed to stand for about ten minutes and is mixed again before casting the now stiff paste into the test discs. The prepared discs are cured in an oven at 50° C. for 24 hours and then desiccated at 10% relative humidity (RH) for another 24 hours before exposing them to the laboratory atmosphere of 50% RH and 73° F. for at least 48 hours before testing.

Additional discs, designated CP-2, are prepared the same as the CP-1 discs with the addition of 10%, 25% and 50% by weight of powdered activated carbon. These percentages are decided upon to study the effect of the carbon at different levels after an initial finding that the addition of carbon to the cement mix completely stopped moisture uptake. The specimens are typically subjected to a high voltage source under programmed heating between two electrodes and are annealed at the final temperature. The total charge acquired in the process by the test specimens is effectively fixed by cooling the test material back to ambient temperature under the voltage field. The initial conformation of the carbon-vinyl adduct is altered to a different orientation that can be reversed and the charge released as depolarization current by a slow programmed heating without the voltage field.

The prepared CP-1 discs typically visibly contain vacuoles and voids and the CP-2 samples, containing the activated carbon, present a smooth surface. Samples taken from both discs can be tested using differential scanning calorimetry (DSC) and thermogravimetry (TG). Furthermore, the CP-2 discs can undergo polarization studies.

Testing

Thermal Studies

In one embodiment, the two well-known thermal techniques of DSC and TG are used for the confirmation of the moisture resistance of the carbonaceous cement. The electrical technique of current measurement from voltage-induced polarization in the test specimens has been utilized for verification of the thermal results and also for confirmation of the carbon-polymer interactive nature in the cement matrix.

FIG. 1 illustrates a DSC thermogram of untreated CP-1 cement. The DSC endotherms shown in FIG. 1 illustrate the loss of moisture due to heating the CP-1 sample as described above.

FIG. 2 illustrates the TG characteristics of the untreated CP-1 cement. The corresponding mass losses (of moisture) as in FIG. 1 are illustrated in FIG. 2.

Figure 4:
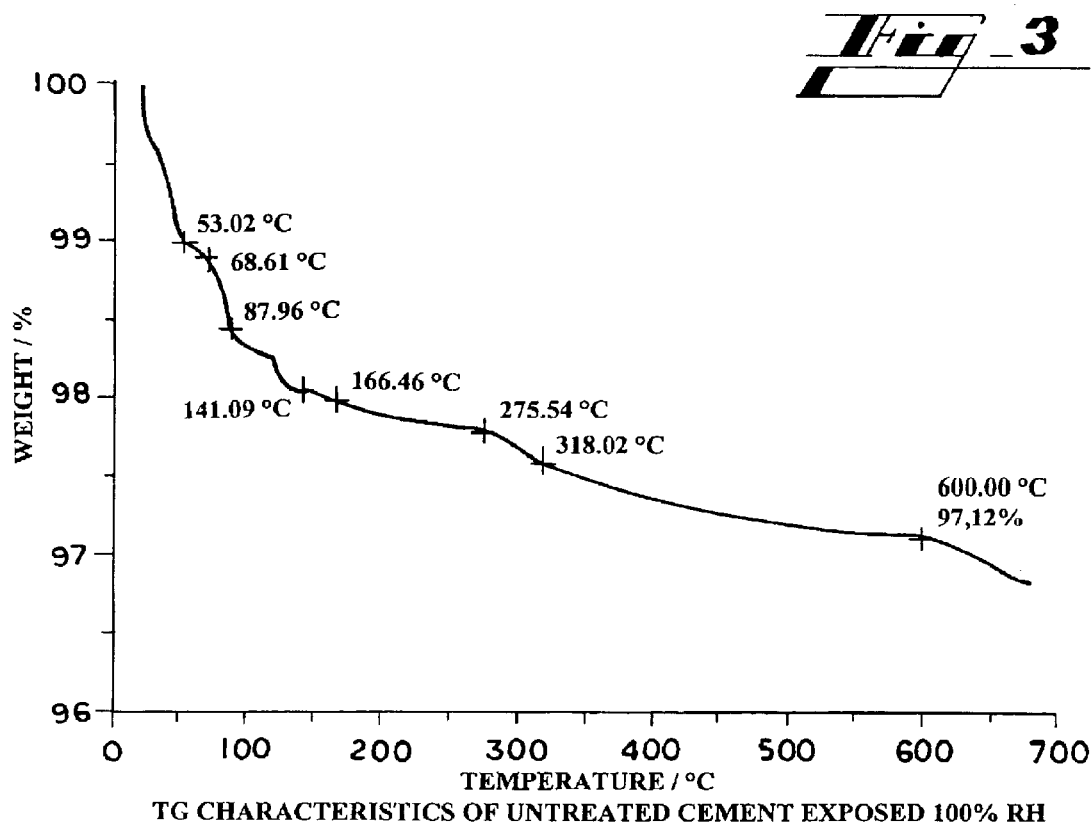
FIG. 4 illustrates the TG characteristics of the CP-1 cement exposed to 100% RH.

When these samples are exposed to 100% relative humidity (RH) in a closed environment for 48 hours and thereafter immediately tested, evidence of moisture uptake is observed as shown in FIGS. 3 and 4, which respectively illustrate the DSC and TG characteristics of the CP-1 cement exposed to 100% RH. The constancy of the DSC exotherm (showing onset at 275° C. and peak at 318° C.), which is further reflected in the corresponding TG characteristics, is typically due to decomposition, in the presence of hydrated silica gel, of $Ca(OH)_2$ crystals formed as a result of partial hydrolysis of $3CaO,SiO_2$.

The CP-2 samples are prepared in the same manner as the CP-1 samples, except for the addition of the activated carbon, demonstrate remarkable moisture resistance. FIGS. 5 and 6 illustrate the DSC thermograms for 10 and 25 weight percentage of activated carbon in cement. DSC Endotherms indicating moisture loss are absent in these figures. Instead, the glass transition temperature (Tg) of the polymer in the cement is evident, which advances with increasing carbon content. The Tg refers to that temperature at which a polymer changes from glassy to a rubbery state. In general, as discussed further below, Tg (as well as decomposition temperature) advance progressively with the addition of the activated carbon. The DSC results illustrate that the activated carbon stops water uptake. Carbon alone has been determined not to be able to shift the Tg of a single bonded polymer. Carbon has to react with the vinyl polymer to produce this shif in Tg. The onset temperature of the exotherm also advances with increasing carbon content. Similar trends have been confirmed by DSC for the 50% carbon level. The Tg in the CP-1 samples is obscured by plasticization and therefore cannot be properly characterized.

The thermal shirs observed with increasing carbon content can be attributed to the interaction of the carbon with the polymer in the cement forming an adduct that blocks moisture uptake. The manifestations of the adduct are characterized farther below. TG characteristics supporting the DSC transition values obtained for the 25% and 50% carbon levels are illustrated in FIGS. 7 and 8.

CP-2 samples can also be exposed to 100% RH for seven days in a closed chamber without showing any indication of moisture absorption other than adsorption, typically present on the surface of the samples. FIGS. 9 and 10 respectively illustrate the TG characteristics of 25% and 50% carbon by weight in cement exposed to 100% RH. The figures illustrate the absence of moisture uptake. The DSC thermograms for the corresponding CP-2 samples before and after moisture exposure are virtually identical at all carbon levels, confirming no moisture absorption for the various carbon contents.

Although higher carbon content is contemplated, some initial studies have indicated that higher carbon content can make the cement brittle. Generally, higher than 50% carbon content is detrimental. Carbon can also catalyze decomposition of the prepared composites at elevated temperatures, but thermal stability also increases with increasing carbon content to a certain extent.

Polarization Studies

Polarization effects are typically obtained in the carbon-cement mixture. No polarization effects occur for carbon alone or cement alone. The conformation of the carbon-polymer adduct in the cement can be altered to a different orientation due to polarization, by applying a high voltage in an increasing thermal field to the test specimen between two electrodes and annealing the sample at the final temperature. The initial polarization due to the applied voltage is brought about by a charge shift throughout the material. The test sample acquires a certain amount of characteristic charge in the process which can be fixed by cooling the test material back to ambient temperature under the voltage field. The orientation can be reversed and the charge released as depolarization current by slow programmed heating without a voltage field. The discharge results in characteristic peaks in different temperature regions.

The CP-2 samples can be subjected to a voltage, typically under the measured breakdown voltage, about 15.5 KV/cm, and be subjected to a temperature as described above. For example, the samples are subjected to a voltage of 10 KV DC starting at 50° C. and heated at a rate of 5° C./min to 265° C. The resulting thermograms, as seen in FIGS. 11–13, confirm the Tg transition and the onset temperature of the DSC exotherms for the corresponding samples. FIG. 11 illustrates the depolarization thermogram of the 10% carbon in cement embodiment. FIG. 12 illustrates the depolarization thermogram of the 25% carbon in cement embodiment. FIG. 13 illustrates the depolarization thermogram of the 50% carbon in cement embodiment. Polarization of the CP-1 samples can typically be unsuccessful. Cement itself cannot typically be polarized because both electrodes become grounded, creating a short circuit. Addition of the activated carbon is necessary for polarization. Activated carbon itself typically does not produce polarization, which confirms the interpretation that a reaction occurs between the activated carbon and the vinyl polymer. FIG. 14 illustrates a standard experimental setup for the polarization studies.

Figure 15:
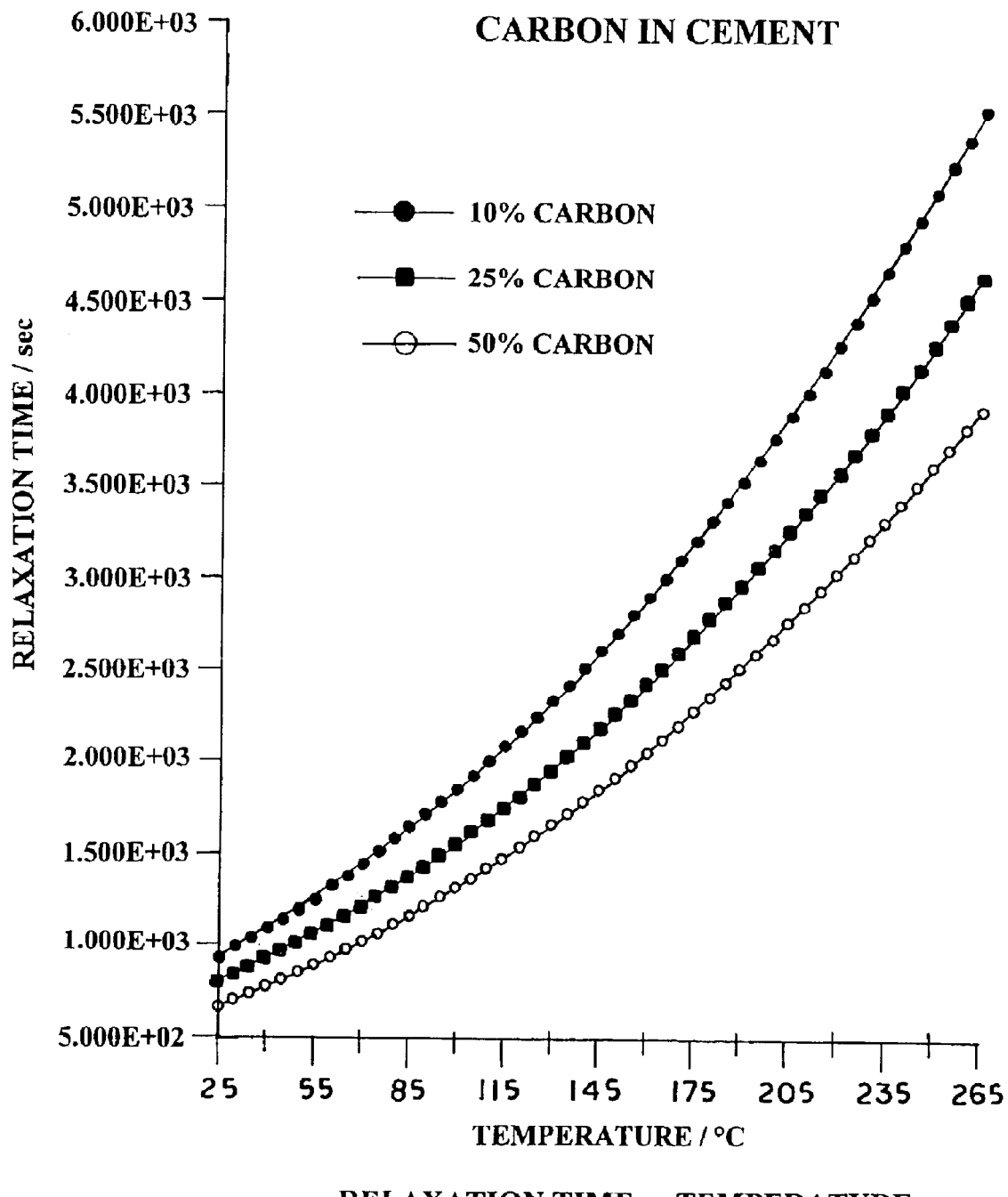
FIG. 15 illustrates the successive changes in relaxation time with temperature for 10%, 25% and 50% carbon in cement embodiments.

The polarization data have offered further explanation of the charge transport parameters relative to the presence of the adduct. Certain parameters can be calculated from the depolarization current that further explain and confirm the existence and characteristics of the adduct. For example, the relaxation time, that is, the finite conversion of charge-carrying electrons from the bound state to the free state can be calculated using the expression, $\tau = KT^2/[H_r \Delta H_{a\ exp} (\Delta H_a/KT)]$, where K is Boltzmanns constant, T is the absolute temperature and $H_r$ the heating rate. $\Delta H_a$ is the activation energy, that is, the energy required to start the process of charge-carrying electron transport, determined from the Arrhenius plot of $\log_n$ current vs. 1/T. FIG. 15 illustrates the successive changes in relaxation time with temperature for 10%, 25% and 50% carbon in cement embodiments. These linear changes at all carbon levels indicate that a single entity is active in the depolarization process, that is, relaxation is due to re-orientation of a single product of reaction between carbon and the Polymer.

The detrapping energy, that is, the energy gap between the polarized state and depolarization, expressed in terms of the relaxation times, can also be calculated using the expression, $\xi = KT \, 1_n \, (\tau_2/\tau_1)$, since successive relaxation times vary according to $\tau_2 = \tau_1 \, _{exp} (\xi)/KT$, where $\tau_1$ is the relaxation time at a given temperature and $\tau_2$ is the relaxation time at the next incremental temperature. FIG. 16 illustrates that depolarization current arises from randomized trap levels that is expected from the random dispersion of the polymer in the cement matrix. The charge carriers are associated with the polymer if the polymer undergoes a conformational change in reaction with the carbon.

The depolarization rate, that is the kinetic factor of temperature dependent depolarization, can also be calculated using the expression, depolarization rate=$[4\pi \, d \, i(T)]/[\alpha(T) \, V \, A]$, where d is the sample thickness in cm, i(T) is the depolarization current as a function of temperature, a(T) is the temperature dependent transport frequency, V is the voltage drop across the sample and A is the surface area of the sample in contact with the electrodes. Voltage drop is obtained by multiplying the measured current by the sample resistance $R=\rho(d/A)$, where $\rho=1$/conductivity, where conductivity=$Ne\mu_D$ and $\mu_D$=J/NeE, where N is the number of charge carriers, J is the current density, e is the magnitude of the charge on the electron and E is the field strength and $\mu_D$ is the drift mobility. N and J are typically calculated from the depolarization current values at each temperature. FIG. 17 illustrates that the depolarization rate is highest for the 50% carbon level in keeping with its lowest relaxation time (see FIG. 15 above), signifying that the ratio of carbon to cement plays a relational role in terms of stoichiometry.

The embodiments described above have been disclosed using vinyl polymers as a central component. It is understood that other vinyl compounds and polymers are contemplated. In addition it is possible that other structures such as vinyl monomers are also contemplated. However, the use of vinyl polymers has been determined to be highly effective in moisture blocking since the polymer can disperse itself throughout the cement matrix due to the chain distribution of the polymer.

The foregoing is considered as illustrative only of the principles of the invention. Further, various modifications maybe made of the invention without departing from the scope thereof and it is desired, therefore, that only such limitations shall be placed thereon as are imposed by the prior art and which are set forth in the appended claims.

What is claimed is:

1. A finished concrete composition, comprising:
   a solidified cement mixture, the mixture including vinyl polymers having double bonds and activated carbon, the composition having a plurality of filled voids, the voids being filled by a carbon-vinyl adduct formed by a chemical reaction between active bonds of the activated carbon and the double bonds of the vinyl polymers.

2. A method of manufacturing concrete having reduced voids, comprising:
   mixing a portion of cement, silica, a vinyl polymer and activated carbon in water, wherein the activated carbon constitutes a weight percentage based on the portion of cement.

3. The method as claimed in claim 2 wherein the activated carbon constitutes 10% of the mass of the cement portion.

4. The method as claimed in claim 2 wherein the activated carbon constitutes 25% of the mass of the cement portion.

5. The method as claimed in claim 2 wherein the activated carbon constitutes 50% of the mass of the cement portion.

6. The method as claimed in claim 2 wherein the cement is comprised of crushed limestone, silica, iron and aluminum.

7. The method as claimed in claim 2 wherein the mixture is mixed to a pasty consistency.

8. The method as claimed in claim 7 wherein the mixture is allowed to stand for a period of time.

9. The method as claimed in claim 8 wherein the mixture is heat treated to form solid concrete.

10. A cement composition, comprising:
    a cement formulation including vinyl polymers having double bonds and activated carbon wherein valence electrons of the activated carbon are in chemical interaction with the Π-electrons of the double bonds of the vinyl polymers, the intraction of the valence electrons and the Π-electrons forming an adduct that is present in voids that are inherent in a cement composition.

* * * * *